US007102645B2

(12) United States Patent
Chow

(10) Patent No.: US 7,102,645 B2
(45) Date of Patent: Sep. 5, 2006

(54) GRAPHICS DISPLAY CONTROLLER PROVIDING ENHANCED READ/WRITE EFFICIENCY FOR INTERFACING WITH A RAM-INTEGRATED GRAPHICS DISPLAY DEVICE

(75) Inventor: Raymond Chow, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/736,142

(22) Filed: Dec. 15, 2003

(65) Prior Publication Data

US 2005/0128205 A1 Jun. 16, 2005

(51) Int. Cl.
*G06F 13/14* (2006.01)
*G06F 13/00* (2006.01)
*G06F 1/26* (2006.01)

(52) U.S. Cl. ........................ 345/520; 345/537; 713/320

(58) Field of Classification Search ................ 345/520, 345/501, 530, 531, 536, 537, 545, 547, 519; 713/320

See application file for complete search history.

(56) References Cited

U.S. PATENT DOCUMENTS 5,317,333 A * 5/1994 Guttag et al. ............... 345/440
5,404,445 A * 4/1995 Matsumoto ................. 345/520
5,699,085 A 12/1997 Takei et al.
5,844,532 A 12/1998 Silverbrook et al.
5,877,741 A * 3/1999 Chee et al. ................. 345/629
6,092,114 A * 7/2000 Shaffer et al. .............. 709/232
6,157,415 A * 12/2000 Glen .......................... 348/599
6,327,002 B1 12/2001 Rinaldi et al.
6,483,510 B1 11/2002 Jeong
6,614,444 B1 * 9/2003 Duluk et al. ................ 345/581
6,938,176 B1 * 8/2005 Alben et al. ................ 713/323
2002/0126108 A1 * 9/2002 Koyama et al. ............ 345/204

FOREIGN PATENT DOCUMENTS

EP 0 602 623 B1 3/1998

OTHER PUBLICATIONS

Everitt, Cass; "Orthogonal Illumination Mapping for Generalized Per-Pixel Lighting"; 2000; http://www.opengl.org/resources/features/oimfinal/.*
Everitt, Cass; "Orthogonal Illumination Mapping for Generalized Per-Pixel Lighting"; 2000; http://www.opengl.org/resources/features/oimfinal/.*

* cited by examiner

*Primary Examiner*—Ulka Chauhan
*Assistant Examiner*—Joni Hsu
(74) *Attorney, Agent, or Firm*—Mark P. Watson

(57) ABSTRACT

A graphics display controller providing enhanced read/write efficiency for interfacing with a RAM-integrated graphics display device. According to the invention, a graphics display controller is disclosed for interfacing between a host and a graphics display device having an associated memory is provided that includes an embedded memory, a format converter, and a data storage memory. The embedded memory is adapted for storing frames of video data received from a host. The format converter is adapted to convert the video data in at least one of two ways: (1) from the data format of the host to the data format of the display device and (2) from the data format of the display device to the data format of the host. The data storage memory has a memory size that is smaller than the embedded memory, and defines a data path that bypasses the embedded memory but connects to the format converter.

25 Claims, 1 Drawing Sheet

GRAPHICS DISPLAY CONTROLLER PROVIDING ENHANCED READ/WRITE EFFICIENCY FOR INTERFACING WITH A RAM-INTEGRATED GRAPHICS DISPLAY DEVICE

FIELD OF THE INVENTION

The present invention relates to a graphics display controller providing enhanced read/write efficiency for interfacing with a RAM-integrated graphics display device.

BACKGROUND

In a graphics display device, such as an LCD (Liquid Crystal Display) panel, video data for display as well as instructions for displaying the data are provided by a host. In principle, any host can interface directly with a display device provided that the host's read/write operations conform to the protocol specified for the display device. However, it is often desirable to provide an application specific graphics display controller as a separate chip, such as an LCD controller, between the host and the display device to provide specialized functions. For example, a display controller chip might be used to automate the transfer of images from a camera to graphics display device, or to allow a host having a parallel bus to interface with a graphics display device having a serial interface and vice versa.

A specific example of such a display controller chip is found in a cellular telephone. The telephone includes a microprocessor functioning as a host CPU, and typically includes one or more RAM ("Random Access Memory")-integrated LCD panels which, for purposes herein, may be considered elements of a single graphics display device. The term "RAM-integrated" refers to the incorporation in the graphics display device of a display or frame buffer.

The display controller chip includes input and output interfaces and a format converter for offloading from the host the task of converting the video data into the format required by the graphics display device, for example, by translating the data from one color space to another. In telephone and other systems used for data communications, such display controllers are used for both wireless and wired communications.

The host generally provides video data and commands to the graphics display device, e.g., to enable selected panels and to specify display parameters such as image size and color resolution. The host may also read data from the display device. For example, the host may read status bits in the display device, or the host may read images from the display device.

Where a display controller is provided, the host communicates with the display device through the controller rather than directly with the display device. Accordingly, the display controller is provided with an embedded memory for reading video data from the host and for writing video data to the display device.

More particularly, there are two known means for writing video data from the host to the RAM-integrated graphics display device through the display controller. First, the host may transmit a full image frame of pixels in a sequential stream to the display controller. The display controller stores the frame in the embedded memory, and formats the data using the format converter. A disadvantage of this method is that a complete frame of data must be transferred in order to change any portion of the display.

Alternatively, the host may write control data to respective command and parameter registers in the display controller. The display controller transfers the data directly to the graphics display device without storing it in the embedded memory or converting its format. However, the host may be required to format the display data prior to transmission, thus losing the benefit of the format converter provided by the display controller.

Recently, the capability to read data from the RAM-integrated graphics display device has been provided by the graphics display controller. The host writes to a register bit in the display controller to trigger a read cycle in the graphics display device. Data from the graphics display device is placed into registers in the controller, in the native format of the graphics display device. However, the host may be required to re-format the data to interpret the data, because the format converter is typically adapted to format data transmitted to the display device and is not bidirectional.

Graphics display controllers typically provide for a fully powered on mode of operation, and an essentially fully powered off or "pass-through" mode where the controller simply passes through data and commands received from the host to the graphics display device. In the fully powered off mode, the host must format the video data. In the pass-through mode, the controller's embedded memory along with its related controlling logic are powered up even when using a writing or reading methodology that does not make use of it. Accordingly, there is a need for a graphics display controller providing enhanced read/write efficiency for interfacing with a RAM-integrated graphics display device.

SUMMARY

A preferred graphics display controller according to the invention interfaces between a host and a graphics display device having an associated memory. The display controller includes an embedded memory, a format converter, and a data storage memory. The embedded memory is adapted for storing data received from a host. The format converter is adapted to convert the data in at least one of two ways: (1) from the data format of the host to the data format of the display device and (2) from the data format of the display device to the data format of the host. The data storage memory has a memory size that is smaller than the embedded memory. The data storage memory is coupled with the host and with the format converter, thereby forming a memory bypass route for bypassing the embedded memory.

A number of methods according to the invention are provided for interfacing between a host and a graphics display device having an associated memory.

In a preferred method, a graphics controller is provided that is disposed on a chip that is separate from the host, the graphics display device and the associated memory. An embedded memory is provided in the graphics controller for storing data received from the host. A low-power control circuit for placing at least the embedded memory in a low-power state is provided in the graphics controller. A format converter is also provided for converting the data from at least one of the data format of the host to the data format of the display device, and the data format of the display device to the data format of the host. The low-power control circuit is activated, and the format of data is converted using the format converter while at least the embedded memory is in a low-power state. Preferably, the method includes transmitting the particular pixel data to the graphics display device while at least the embedded memory is in a low-power state.

In a another preferred method, a graphics display controller is disposed on a chip that is separate from the host, the graphics display device and the associated memory. An embedded memory is provided in the graphics controller for storing data received from the host. A format converter is also provided for converting data from at least one of the data format of the host to the data format of the display device, and the data format of the display device to the data format of the host. Further, a data storage memory is provided having a memory size that is smaller than the embedded memory. The data storage memory is coupled with the host and with the format converter, thereby forming a memory bypass route for bypassing the embedded memory. Preferably, pixel data is written to the data storage memory instead of the embedded memory, and the pixel data is transferred from the data storage memory to the memory associated with the graphics display device.

DETAILED DESCRIPTION OF A PREFERRED EMBODIMENT

Preferred embodiments of the invention make use of RAM-integrated graphics display devices, particularly LCD panels used in wireless communications systems. However, it should be understood that the invention may make use of any graphics display device and any associated memory used for any purpose.

Figure 1:
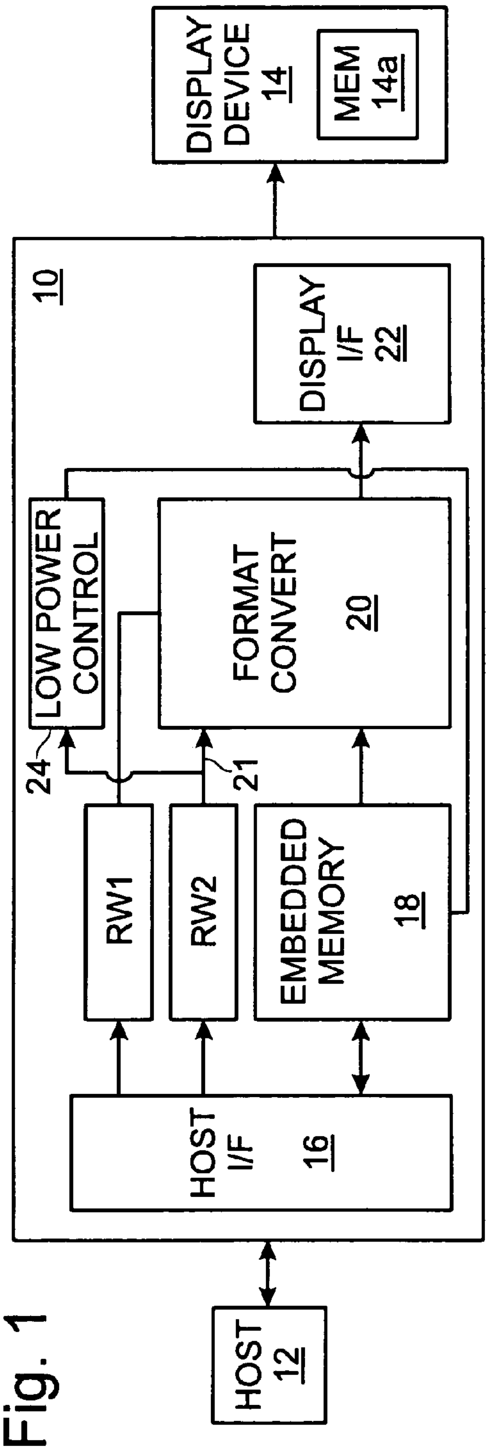
FIG. 1 is a block diagram of a graphics display controller providing enhanced read/write efficiency for interfacing with a RAM-integrated graphics display device according to the present invention, adapted to provide a write feature.

FIG. 1 shows a graphics display controller 10 according to the present invention adapted to provide a write feature. The controller 10 provides an interface between a host computer or processor 12 and a RAM-integrated graphics display device 14, which typically includes one or more LCD panels integrated with an on-board memory 14*a*. The display controller 10 is a separate chip from the host 12 and the display device 14 along with its associated memory.

The display controller 10 includes a host interface ("I/F") 16 for interfacing the display controller to the host 12, an embedded memory 18, a format converter 20, and a graphics display I/F 22 for interfacing the display controller to the display device 14.

The embedded memory 18 is used to store frames of video data and so may also be referred to as a frame buffer. Video data are stored as pixels in the embedded memory. The embedded memory is typically SRAM (Static RAM).

The format converter 20 converts data transmitted to the display device 14 by the host 12 to the format appropriate for the display device. For example, the display device 14 may require an RGB ("Red Green Blue") format of 4, 4, 4, (12 bits/pixel), while the host transmits data in RGB 5, 6, 5 format (16 bits/pixel). In this example, the format converter 20 would convert RGB 5, 6, 5 data to RGB 4, 4, 4 data.

To implement a write feature according to the present invention, the display controller 10 further includes a control or "bit/pixel mode select" register RW1 and a data or "pixel data write" register RW2. To write to (or "access") the display memory 14*a*, the host writes pixel data to the pixel data write register RW2. The data flow through a data path 21 that bypasses the embedded memory 18, but connects or leads to the format converter 20, so that the data are presented to the format converter for format conversion where format conversion is required. The data are then passed to the display device 14 through the display I/F 22. Preferably, the input format for the register RW2, e.g. 8 bits/pixel or 16 bits/pixel, is specified to the format converter 20 by the state of the register RW1.

Figure 2:
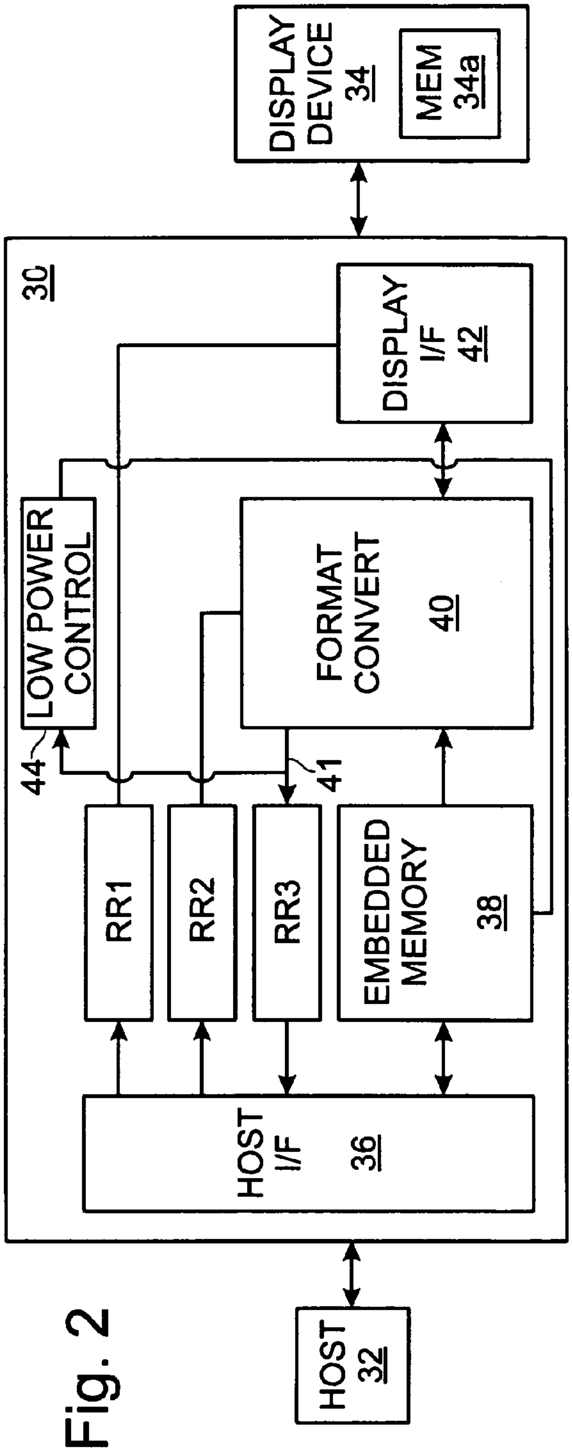
FIG. 2 is a block diagram of a graphics display controller providing enhanced read/write efficiency for interfacing with a RAM-integrated graphics display device according to the present invention, adapted to provide a read feature.

FIG. 2 shows a graphics display controller 30 according to the present invention adapted to provide a read feature. The controller 30 provides an interface between a host computer or processor 32 and a RAM-integrated graphics display device 34 having a memory 34*a*.

Similar to the display controller 10, the display controller 30 includes a host interface ("I/F") 36 for interfacing the display controller to the host 32, an embedded memory 38, a format converter 40, and a graphics display I/F 42 for interfacing the display controller to the display device 34.

To implement a read feature according to the present invention, the display controller 30 further includes a first control or "bit/pixel select" register RR1, a second control or "read trigger" register RR2, and a data or "pixel data read" register RR3. To read (or "access") the display memory 34*a*, the host writes a bit to the register RR2. This signals the display I/F 42 to trigger an access of the display memory 34*a* The number of read cycles required to read 1 pixel of data from the memory 34*a* is determined by the controller 30 based on the configured graphics display format, which is received through the display I/F 42, and the contents of the register RR1. Data read from the display memory 34*a* flows through a data path 41 that bypasses the embedded memory 38, but connects to, or leads from, the format converter 40, so that the data have had their format converted where format conversion is required. The data flows out of the controller 30 to the host 32 through the pixel data read register RR3 and the host I/F 36. Preferably, the output format for the register RR3, e.g. 8 bits/pixel or 16 bits/pixel, is specified by the state of the register RR1.

Alternatively, the read feature can be implemented to take advantage of multiple read cycles, e.g., multiple pixel reads, without requiring a trigger signal for each pixel. For example, the register RR2 may be used to signal a burst mode access of the memory of the graphics display device, so that an uninterrupted stream of data flows through the register RR3.

In addition to providing a powersave feature of the display controllers 10 and 30 in conjunction with a pass-through mode of operation of the controllers as is typical in the art, the controllers 10 and 30 preferably provide an enhanced powersave feature that corresponds to time periods during which the host writes to the register RW2 or reads from the register RR3. More particularly, while other controller modules are placed in a low power state and are thus inactive, the format converters 20 and 40 are dynamically activated while accessing the graphics display device so that the host is relieved of any requirement to format pass-through data. For example, the host can update the graphics display, or read from or write to the display, in the native format for communicating with the display controller even though memory controller and display buffer circuitry in the display controller is disabled. The enhanced powersave mode may be provided under the control of respective low power control circuits 24, 44 in the display controllers.

In addition to providing for an enhanced low power mode of operation of a display controller, the invention provides a number of other outstanding features. For example, the invention provides for writing or reading individual pixel data or portions of RGB formatted pixel data to or from the graphics display device without pre-processing or post-processing the data to accommodate the format required by the graphics display device. The invention further provides for changing portions of the display without requiring the transfer of a complete frame of display data. Still further, the invention provides for the host reading or writing individual pixel data or portions of RGB formatted pixel data in the same format that it writes to the embedded memory. Moreover, the size of the display is no longer limited by the size of the embedded memory, because the host can supplement the embedded memory with host system memory. These and other features according to the invention can be easily implemented in standard graphics display controllers as will be readily appreciated by persons of ordinary skill.

These and other features according to the present invention provide the outstanding advantages of reducing power consumption, host bus traffic, and processing overhead.

It is to be recognized that, while a particular graphics display controller providing enhanced read/write efficiency for interfacing with a RAM-integrated graphics display device has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A graphics display controller adapted to interface between a host and a graphics display device having an associated memory, the display controller comprising:

- an embedded memory for storing data received from the host;
- a format converter, coupled with the embedded memory and with the memory associated with the display device, for converting data from at least one of:
  - (a) the data format of the host to the data format of the display device, and
  - (b) the data format of the display device to the data format of the host; and
- a data storage memory having a memory size that is smaller than the embedded memory, the data storage memory being coupled with the host and with the format converter, thereby forming a memory bypass route for bypassing the embedded memory.

2. The graphics display controller of claim 1, wherein the graphics controller is adapted for writing data to the memory associated with the graphics display device through the memory bypass route.

3. The graphics display controller of claim 2, further comprising a bit-per-pixel select register for specifying to the controller the number of bits in a pixel.

4. The graphics display controller of claim 1, wherein the graphics controller is adapted for reading data from the memory associated with the graphics display device through the memory bypass route.

5. The graphics display controller of claim 4, further comprising a bit-per-pixel select register for specifying to the controller the number of bits in a pixel.

6. The graphics display controller of claim 5, further comprising a control register for triggering the reading of data from the memory associated with the graphics display device through the memory bypass route.

7. The graphics display controller of claim 4, further comprising logic for generating a particular number of cycles required for reading one pixel from the memory associated with the display device.

8. The graphics display controller of claim 4, further comprising logic for generating a particular number of cycles required for reading a plurality of pixels from the memory associated with the display device.

9. The graphics display controller of claim 1, wherein the data storage memory is adapted for storing at least one pixel.

10. The graphics display controller of claim 1, further comprising a low-power control circuit for placing at least the embedded memory in a low-power state.

11. The graphics display controller of claim 1, wherein the embedded memory is adapted for storing a full frame of pixel data.

12. The graphics display controller of claim 1, wherein the memory associated with the display device is incorporated in the display device.

13. A method for interfacing between a host and a graphics display device having an associated memory, the method comprising:

- providing a graphics display device having an associated memory;
- providing a graphics display controller disposed on a chip that is separate from the host and the graphics display device, the graphics display controller including:
  - an embedded memory for storing data received from the host;
  - a low-power control circuit for placing at least the embedded memory in a low-power state;
  - a format converter, coupled with the embedded memory and with the memory associated with the display device, for converting data from at least one of:
    - (a) the data format of the host to the data format of the display device, and
    - (b) the data format of the display device to the data format of the host;
- activating the low-power control circuit, thereby placing at least the embedded memory in a low-power state; and
- converting the format of particular pixel data using the format converter while at least the embedded memory is in a low-power state.

14. The method of claim 13, wherein the step of converting the format of particular pixel data includes converting pixel data provided by the host.

15. The method of claim 14, further comprising transmitting the particular pixel data to the graphics display device while at least the embedded memory is in a low-power state.

16. The method of claim 14, wherein the step of converting the format of the particular pixel data includes converting data provided from the memory associated with the display controller.

17. The method of claim 14, further comprising transmitting the particular pixel data to the host while at least the embedded memory is in a low-power state.

18. The method of claim 14, wherein the step of providing a display device includes providing a RAM-integrated graphics display device having an associated memory incorporated in the display device.

19. A method for interfacing between a host and a graphics display device having an associated memory, the method comprising:

providing a display device having an associated memory;

providing a graphics display controller disposed on a chip that is separate from the host and the graphics display device, the graphics display controller including:

an embedded memory for storing data received from the host;

a format converter, coupled with the embedded memory and with the memory associated with the display device, for converting data from at least one of:

(a) the data format of the host to the data format of the display device, and (b) the data format of the display device to the data format of the host; and a data storage memory having a memory size that is smaller than the embedded memory, the data storage memory being coupled with the host and with the format converter, thereby forming a memory bypass route for bypassing the embedded memory.

20. The method of claim 19, further comprising:

writing particular data to the data storage memory instead of the embedded memory; and transferring the particular pixel data from the data storage memory to the memory associated with the graphics display device.

21. The method of claim 20, wherein the particular data is pixel data, further comprising converting the format of the particular data using the format converter.

22. The method of claim 20, wherein the particular data is control data.

23. The method of claim 22, wherein the particular data is pixel data, further comprising converting the format of the particular data using the format converter.

24. The method of claim 19, further comprising:

transferring particular pixel data from the associated memory for the graphics display device to the data storage memory; and reading the particular pixel data from the data storage memory instead of the embedded memory.

25. The method of claim 19, wherein the step of providing a display device includes providing a RAM-integrated graphics display device having an associated memory incorporated in the display device.

* * * * *

UNITED STATES PATENT AND TRADEMARK OFFICE

CERTIFICATE OF CORRECTION

PATENT NO. : 7,102,645 B2
APPLICATION NO. : 10/736142
DATED : September 5, 2006
INVENTOR(S) : Raymond Chow It is certified that error appears in the above-identified patent and that said Letters Patent is hereby corrected as shown below:

Column 6,

Line 56, please change “14” to --13--

Line 59, please change “14” to --13--

Line 63, please change “14” to --13-- and

Line 66, please change “14” to --13--.

Signed and Sealed this

Twenty-sixth Day of December, 2006

JON W. DUDAS
*Director of the United States Patent and Trademark Office*